US012698175B2

(12) United States Patent
Ji et al.

(10) Patent No.: US 12,698,175 B2
(45) Date of Patent: Aug. 4, 2026

(54) SEPARATOR SUPPLY DEVICE AND SEPARATOR SUPPLY METHOD

(71) Applicant: SK ON CO., LTD., Seoul (KR)

(72) Inventors: Seong In Ji, Daejeon (KR); Jae Young Jung, Daejeon (KR)

(73) Assignee: SK On Co., Ltd., Seoul (KR)

( * ) Notice: Subject to any disclaimer, the term of this patent is extended or adjusted under 35 U.S.C. 154(b) by 20 days.

(21) Appl. No.: 18/763,322

(22) Filed: Jul. 3, 2024

(65) Prior Publication Data

US 2025/0011120 A1    Jan. 9, 2025

(30) Foreign Application Priority Data

Jul. 5, 2023    (KR) ........................ 10-2023-0087072
May 2, 2024    (KR) ........................ 10-2024-0058310

(51) Int. Cl.
*B65H 19/20*        (2006.01)
*B65H 19/18*        (2006.01)
*H01M 10/04*        (2006.01)

(52) U.S. Cl.
CPC ......... *B65H 19/1852* (2013.01); *B65H 19/20* (2013.01); *B65H 2301/4607* (2013.01); *B65H 2301/46314* (2013.01); *B65H 2301/46412* (2013.01); *B65H 2405/50* (2013.01); *B65H 2701/19* (2013.01); *H01M 10/0404* (2013.01)

(58) Field of Classification Search
CPC .... B65H 19/18; B65H 19/1852; B65H 19/20; B65H 2301/4607; B65H 2301/4622; B65H 2301/46174
See application file for complete search history.

(56) References Cited

U.S. PATENT DOCUMENTS

| | | | | |
|---|---|---|---|---|
| 6,923,880 | B2 * | 8/2005 | Keene ................ | B65H 23/1886 |
| | | | | 156/159 |
| 8,002,924 | B2 * | 8/2011 | Machamer ......... | B65H 19/1836 |
| | | | | 156/159 |
| 9,670,022 | B2 * | 6/2017 | Machamer .............. | B29C 66/43 |
| 10,287,123 | B2 * | 5/2019 | Pedercini ............... | B65H 21/00 |
| 2004/0107564 | A1 * | 6/2004 | Kurimoto ......... | H01M 10/0409 |
| | | | | 29/730 |
| 2016/0152369 | A1 * | 6/2016 | Pedercini .................. | B65C 9/08 |
| | | | | 156/355 |

FOREIGN PATENT DOCUMENTS

| | | |
|---|---|---|
| JP | 2013-043660 A | 3/2013 |
| KR | 10-1892583 B1 | 8/2018 |
| KR | 10-2370747 B1 | 3/2022 |

* cited by examiner

*Primary Examiner* — Sang K Kim
(74) *Attorney, Agent, or Firm* — Jones Day

(57)    ABSTRACT

A separator supply device is provided. The separator supply device includes a frame, a separator supply portion mounted on the frame, and including a first reel mounting portion configured to accommodate a first reel configured to be wound with a first separator, and a second reel mounting portion configured to accommodate a second reel, spaced apart from the first reel, and configured to be wound with a second separator, and a separator connection portion configured to adsorb an end of the first separator unwound from the first reel and an end of the second separator unwound from the second reel and to connect the first separator to the second separator.

19 Claims, 11 Drawing Sheets

SEPARATOR SUPPLY DEVICE AND SEPARATOR SUPPLY METHOD

CROSS-REFERENCE TO RELATED APPLICATION(S)

This patent document claims the priority and benefits of Korean Patent Application No. 10-2023-0087072 filed on Jul. 5, 2023 and Korean Patent Application No. 10-2024-0058310 filed on May 2, 2024. The entire contents of the before-mentioned applications are incorporated by reference as part of the disclosure of this document.

TECHNICAL FIELD

The disclosure and implementations disclosed in this patent document generally relate to a separator supply device and a separator supply method.

BACKGROUND

Unlike primary batteries, secondary batteries may be charged and discharged, and may thus be applied to devices within various fields such as digital cameras, mobile phones, laptops, hybrid cars, electric cars, and energy storage systems (ESS). Examples of the secondary battery may include lithium ion batteries, nickel-cadmium batteries, nickel-metal hydride batteries, and nickel-hydrogen batteries.

A secondary battery may include an electrode assembly including a cathode, an anode, and a separator.

SUMMARY

The disclosed technology may be implemented in some embodiments to provide a separator supply device configured to form battery cells by supplying a separator to an electrode assembly manufacturing device. For efficient supply of the separator, the separator supply device may include a reel wound with a traveling or mobile separator and a reel wound with a standby or stationary separator. However, in order for an operator to manually replace the traveling or mobile separator and the standby or stationary separator, the operation of the separator supply device may need to be stopped. When the separator supply device is operated, this may result in reduced production efficiency and longer manufacturing times.

In an aspect of the disclosed technology, a separator supply device may automatically replace a separator to increase production efficiency and shorten a manufacturing time.

Battery cells manufactured using the separator supply device or the separator supply method based on some embodiments may be widely applied in green technology fields such as electric vehicles, battery charging stations, as well as solar power generation and wind power generation using other batteries. In addition, battery cells manufactured using the separator supply device based on some embodiments may be used in eco-friendly electric vehicles and hybrid vehicles and the like to ameliorate climate change by suppressing air pollution and greenhouse gas emissions.

In some embodiments of the disclosed technology, a separator supply device includes a frame, a separator supply portion mounted on the frame, and including a first reel mounting portion configured to accommodate a first reel configured to be wound with a first separator, and a second reel mounting portion configured to accommodate a second reel, spaced apart from the first reel, and configured to be wound with a second separator, and a separator connection portion configured to adsorb an end of the first separator unwound or released from the first reel and an end of the second separator unwound or released from the second reel and to connect the first separator to the second separator.

The separator connection portion may include a first connection portion including a first adsorption portion configured to adsorb an end of the first separator, a first cutting portion configured to cut the first separator attached to the first adsorption portion, and a first body portion configured to connect the first adsorption portion and the first cutting portion to each other, and a second connection portion including a second adsorption portion configured to adsorb an end of the second separator, a second cutting portion configured to cut the second separator attached to the second adsorption portion, and a second body portion configured to connect the second adsorption portion and the second cutting portion to each other.

The first connection portion may include a first rotation axis rotatably connecting the first body portion to a first moving unit of the frame, the second connection portion may include a second rotation axis rotatably connecting the second body portion to a second moving unit of the frame, the first adsorption portion and the first cutting portion may be configured to rotate together with the first body portion, the second adsorption portion and the second cutting portion may be configured to rotate together with the second body portion, and the first adsorption portion and the second adsorption portion may be configured to at least partially face each other based on rotation of the first connection portion or the second connection portion. For example, the first adsorption portion and the second adsorption portion are configured to at least partially face each other as at least one of the first connection portion or the second connection portion rotates.

The separator supply device may further include a driving member including a first driving member configured to move the first body portion relative to the frame and a second driving member configured to move the second body portion relative to the frame.

The first connection portion may include a first roller connected to the first body portion and configured to guide movement of the first separator, and the second connection portion may include a second roller connected to the second body portion and configured to guide movement of the second separator. For example, the first connection portion includes a first roller connected to the first body portion and configured to guide the first separator to move in a first predetermined direction.

The first adsorption portion may include a first adsorption pad and a second adsorption pad spaced apart from the first adsorption pad, the first cutting portion may be configured to reciprocate between the first adsorption pad and the second adsorption pad, the second adsorption portion may include a third adsorption pad and a fourth adsorption pad spaced apart from the third adsorption pad, and the second cutting portion may be configured to reciprocate between the third adsorption pad and the fourth adsorption pad.

The first adsorption pad may be configured to be attached to an end of the first separator, the fourth adsorption pad may be configured to be attached to an end of the second separator, the first adsorption pad may be configured to press the end of the first separator and a connecting tape together with the third adsorption pad, and the second adsorption pad may be configured to press the end of the second separator and the connecting tape together with the fourth adsorption pad.

In a state in which at least a portion of the first adsorption portion faces at least a portion of the second adsorption portion, the first adsorption portion or the second adsorption portion may be configured to move toward each other. The first connection portion may be configured to move in a first direction or a second direction, opposite to the first direction, while being connected to the first separator, and the second connection portion may be configured to move in the first direction or the second direction, while being connected to the second separator.

The frame may include a first opening configured to expose at least a portion of the first separator to an outside of the frame and a second opening configured to expose at least a portion of the second separator to the outside of the frame.

The separator supply device may include a cover portion including a first cover configured to cover the first opening, and a second cover configured to cover the second opening.

The separator supply device may include a partition wall connected to the frame and at least partially located between the first reel and the second reel.

The separator supply device may include a sensor module configured to detect a winding amount of at least one of the first separator and the second separator. In some implementations, the term "winding amount" can be used to indicate the number of times a separator winds around a reel.

The separator supply device may include a processor configured to control operations of the separator supply portion and the separator connection portion, based on information detected by the sensor module. The processor may be configured to generate a signal for moving at least a portion of the separator connection portion based on a remaining amount of the first separator or the second separator.

The separator supply device may further include a guide member including a first guide member configured to guide a movement of the first separator, a second guide member configured to guide a movement of the second separator, and a third guide member configured to selectively guide the movement of the first separator or the second separator.

In some embodiments of the disclosed technology, a separator supply method includes a first separator supply process of discharging a first separator using a first reel configured to be wound with the first separator thereon, a forward process of moving a connection portion including a second adsorption portion in a first direction to attach a connecting tape to a second separator spaced apart from the first separator, a backward process of moving the connection portion in a second direction, opposite to the first direction, a cutting process of cutting the first separator using a first cutting portion, a rotation process of rotating the connection portion so that the second adsorption portion attached to the second separator faces a first adsorption portion attached to the first separator, a connection process of attaching the connecting tape to the first separator and the second separator using the first adsorption portion and the second adsorption portion, and a second separator supply process configured to discharge the second separator using a second reel configured to be wound with the second separator thereon.

The method may further comprise detecting a winding amount of at least one of the first separator and the second separator.

The method may further comprise controlling operations of the separator supply portion and the separator connection portion, based on information detected by a sensor module configured to detect a winding amount of at least one of the first separator and the second separator.

The method may further comprise generating a signal for moving at least a portion of the separator connection portion based on a remaining amount of the first separator or the second separator.

The method may further comprise guiding a movement of the first separator using a first guide member, guiding a movement of the second separator using a second guide member, and selectively guiding the movement of the first separator or the second separator using a third guide member.

BRIEF DESCRIPTION OF DRAWINGS

Certain aspects, features, and advantages of the disclosed technology are illustrated by the following detailed description with reference to the accompanying drawings.

DETAILED DESCRIPTION

Features of the disclosed technology disclosed in this patent document are described by example embodiments with reference to the accompanying drawings.

The disclosed technology may be implemented in some embodiments to provide a separator supply device and a separator supply method.

Hereinafter, the disclosed technology will be described in detail with reference to the attached drawings. However, this is merely illustrative and the disclosed technology is not limited to the specific embodiments described by way of example.

Figure 1:
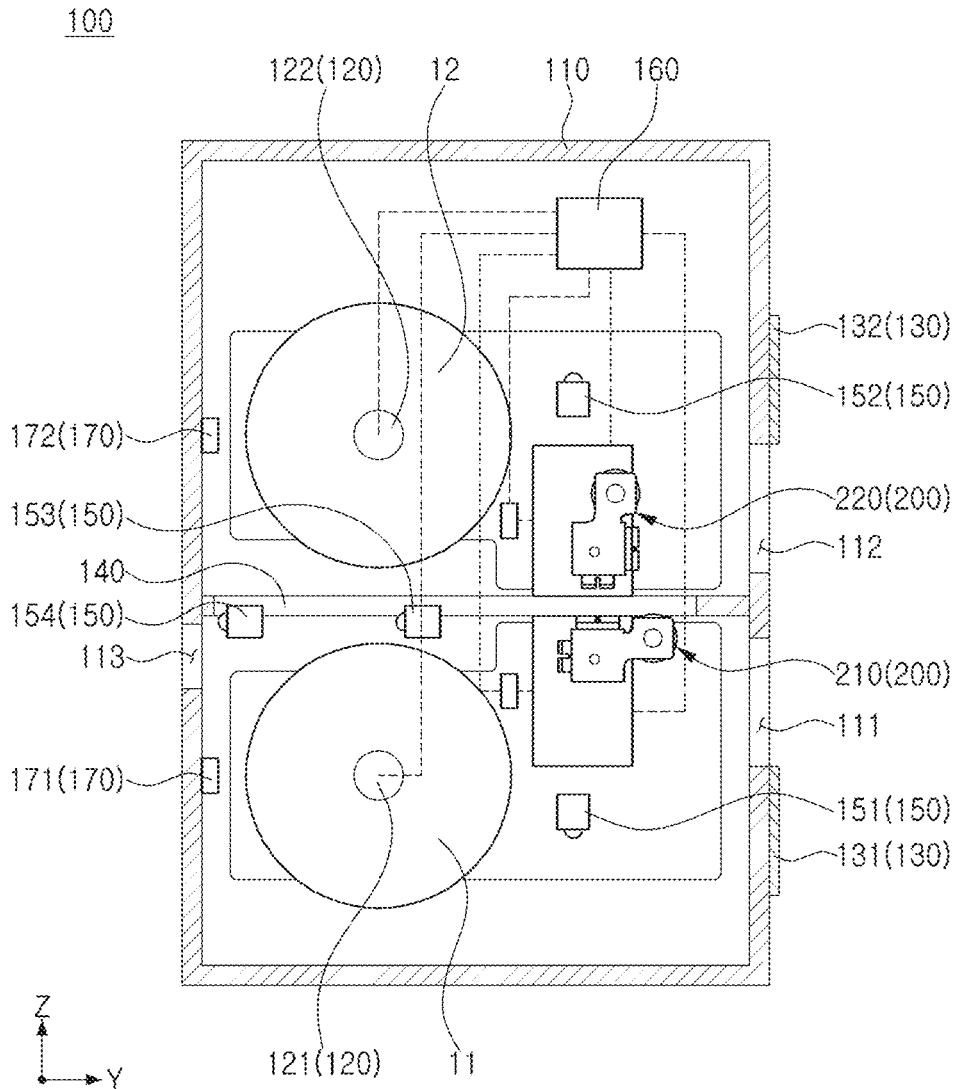
FIG. 1 is a side view of a separator supply device based on an embodiment.
Figure 2:
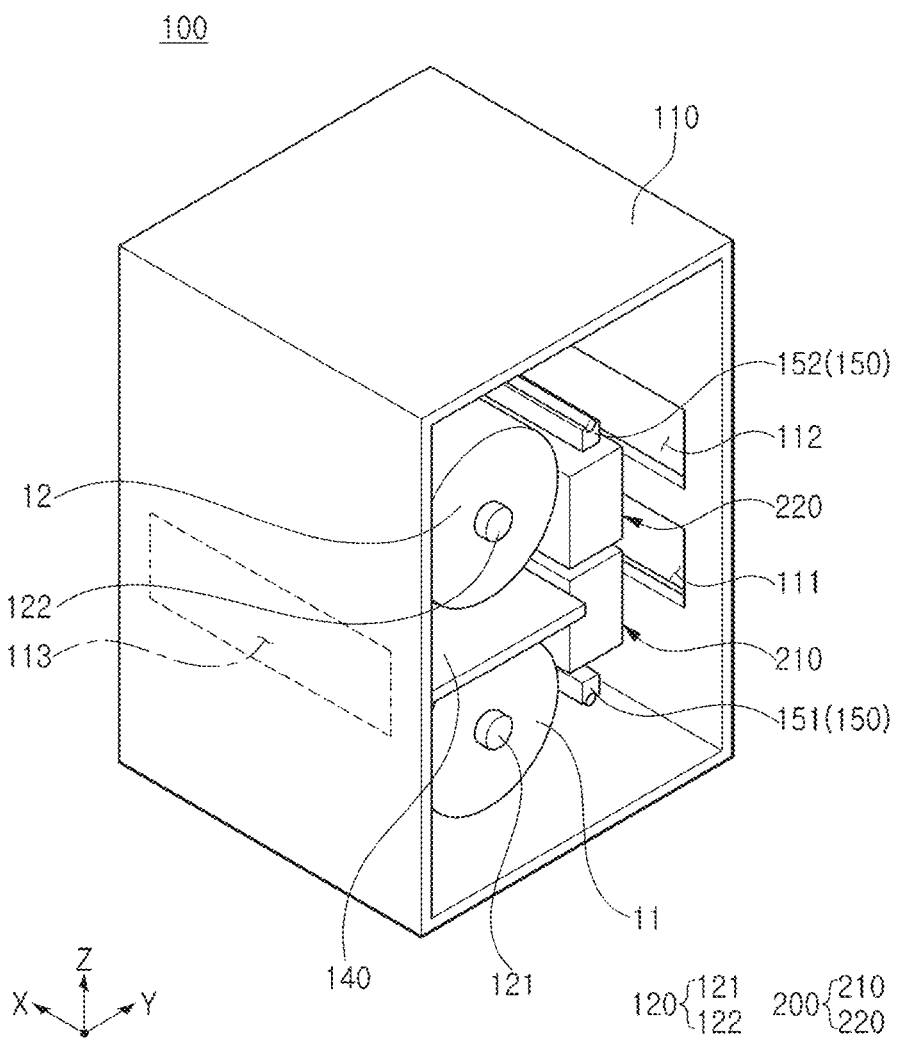
FIG. 2 is a cross-sectional perspective view of a separator supply device based on an embodiment.
Figure 3:
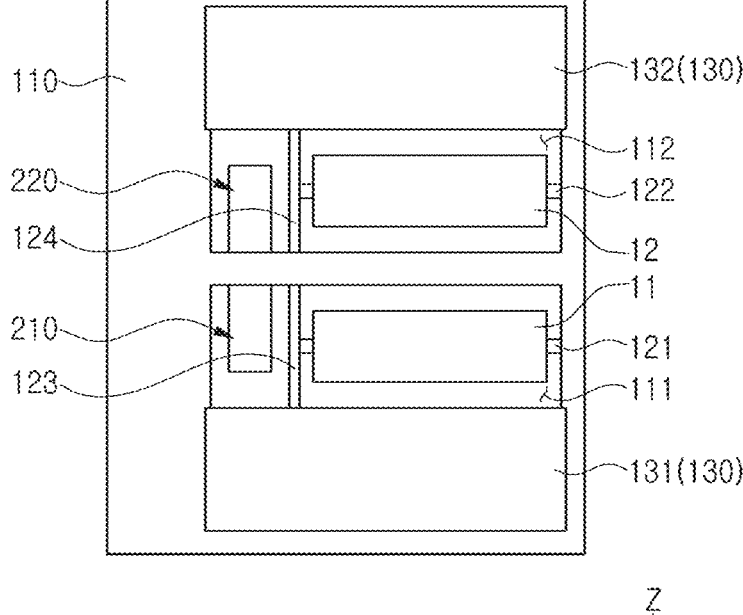
FIG. 3 is a rear schematic view of a separator supply device based on an embodiment.

FIG. 1 is a side view of a separator supply device based on an embodiment. FIG. 2 is a cross-sectional perspective view of a separator supply device based on an embodiment. FIG. 3 is a rear schematic view of a separator supply device based on an embodiment.

Referring to FIGS. 1, 2, and/or 3, a separator supply device 100 may include a frame 110, a separator supply portion 120, and a separator connection portion 200.

The separator supply device 100 may supply a separator for a secondary battery. Separators 11 and 12 provided from the separator supply device 100 may be used to manufacture an electrode assembly of a battery cell. In an embodiment, the separator supply device 100 may be referred to as a separator exchange device or a separator automatic exchange device. In an embodiment, the separators 11 and 12 are interposed between the cathode and the anode to prevent electrical short circuit between the cathode and the anode and generate a flow of ions.

The frame 110 may form at least part of the exterior of the separator supply device 100. In some embodiments, the frame 110 may be a case or a container of the separator supply device 100.

The frame 110 may accommodate at least some of the components of the separator supply device 100. For example, the frame 110 may accommodate the separator supply portion 120 and the separator connection portion 200 inside the frame 110.

The frame 110 may include openings 111, 112, and 113 for exposing at least portions of the separators 11 and 12 to the outside of the separator supply device 100.

In an embodiment, the frame 110 may include a first opening 111, and a second opening 112 spaced apart from the first opening 111. The first opening 111 may expose a portion of the first separator 11 to the outside of the frame 110. An operator may attach a connecting tape (e.g., connecting tape 20 shown in FIG. 9) to the first separator 11 through the first opening 111. The second opening 112 may expose a portion of the second separator 12 to the outside of the frame 110. An operator may attach the connecting tape 20 to the second separator 12 through the second opening 112. The frame 110 may include a third opening 113 for selectively discharging the first separator 11 or the second separator 12 to the outside of the frame 110. The separators 11 and 12 discharged through the third opening 113 may be used to manufacture an electrode assembly. In an embodiment, the third opening 113 may be located in the opposite direction of the first opening 111 or the second opening 112.

In an embodiment, the separator supply device 100 may include a connecting tape attachment member (not illustrated) for attaching the connecting tape 20 to the separators 11 and 12. The connecting tape attachment member may attach the connecting tape 20 to the ends of the separators 11 and 12. In an embodiment, at least a portion of the connecting tape attachment member may face at least a portion of adsorption portions 211 and 221 of the separator connection portion 200. In an embodiment, the connecting tape attachment member may be connected to the frame 110 and located inside the frame 110. In an embodiment, at least a portion of the connecting tape attachment member may pass through the openings 111 and 112 to attach the connecting tape 20 to the separators 11 and 12.

A plurality of reels 121 and 122 may be used to supply the separators 11 and 12. For example, the separator supply portion 120 may include a first reel 121 and a second reel 122 spaced apart from the first reel 121. The first reel 121 may accommodate the first separator 11, and the second reel 122 may accommodate the second separator 12. For example, the first separator 11 may be wound on the first reel 121, and the second separator 12 may be wound on the second reel 122. In an embodiment, the reels 121 and 122 may be bobbins or rolls. In an embodiment, the first reel 121 and the second reel 122 may respectively include a first reel mounting portion 123 or a second reel mounting portion 124. For example, the separator supply portion 120 may include a first reel mounting portion 123 for accommodating the first reel 121 configured to wind the first separator 11 therearound, and a second reel mounting portion 124 for accommodating the second reel 122 configured to wind the second separator 12 therearound.

In an embodiment, an operator may provide the reels 121 and 122, on which the separators 11 and 12 are wound, to the separator supply device 100 through the openings 111 and 112. For example, the operator may mount the reels 121 and 122, on which the separators 11 and 12 attached with a connecting tape (e.g., the connecting tape 20 in FIG. 9) thereon are wound, on the rotation axes (or reel mounting portions) of the reels 121 and 122. The first separator 11, to which the connecting tape 20 is attached, may be supplied to the separator supply device 100 through the first opening 111. The second separator 12, to which the connecting tape 20 is attached, may be supplied to the separator supply device 100 through the second opening 112.

The first separator 11 and the second separator 12 may be used interchangeably with each other. In an embodiment, the first separator 11 may be a driving separator or a used separator, and the second separator 12 may be a standby separator or a preliminary separator. For example, after the first separator 11 is used, the first separator 11 may be replaced with the second separator 12. In some embodiments, the first separator 11 is replaced with the second separator 12 after the first separator 11 is used, but the order of use of the first separator 11 and the second separator 12 is not limited thereto.

The separator supply device 100 may supply the separators 11 and 12 using a plurality of automatically replacing reels 121 and 122. For example, the amount (for example, length or volume) of the separators 11 and 12 that may be wound on one reel 121 or 122 may be limited. In the separator supply device 100 based on an embodiment of the disclosed technology, when the first separator 11 used is used in a specified amount (e.g., length or volume), work efficiency may be increased by changing the reel used, from the first reel 121 to the second reel 122. The separator supply device 100 based on some embodiments may reduce the replacement time of the separators 11 and 12 in use. The structure in which the separators 11 and 12 supplied by the separator supply device 100 are changed is further described in FIGS. 3 to 10.

The separator connection portion 200 may connect the first separator 11 and the second separator 12. For example, the separator connection portion 200 may adsorb the end (e.g., the end 11a of FIG. 9) of the first separator 11 unwound or released from the first reel 121 and the end (e.g., end 12a of FIG. 9) of the second separator 12 unwound or released from the second reel 122, and may connect the first separator 11 and the second separator 12 to each other. The separator connection portion 200 may include a first connection portion 210 configured to cut the first separator 11 and a second connection portion 220 configured to cut the second separator 12. The cut first separator 11 may be connected to the second separator 12. In an embodiment, the second connection portion 220 may be driven independently of the first connection portion 210. The structure of the separator connection portion 200 is further described in FIGS. 3 to 10.

The separator supply device 100 may include a cover portion 130 configured to cover the openings 111 and 112. The cover portion 130 covers the openings 111 and 112 to prevent safety accidents and malfunctions of the separator supply device 100. For example, the cover portion 130 may prevent an operator's body portion from unintentionally entering the interior of the separator supply device 100. The cover portion 130 may provide a space for an operator to attach the connecting tape 20 to the separators 11 and 12 by exposing the openings 111 and 112. The cover portion 130 may be connected to the frame 110 to be relatively movable thereto. In an embodiment, the cover portion 130 may be connected to the frame 110, to be movable in a sliding manner. In another embodiment (not illustrated), the cover portion 130 may be hinged to the frame 110. In an embodiment, the cover portion 130 may include a first cover 131 configured to cover the first opening 111 and a second cover 132 configured to cover the second opening 112. In an embodiment, the cover portion 130 may be referred to as a door.

The separator supply device 100 may include a partition wall 140 connected to the frame 110 and partitioning the internal space of the frame 110. At least a portion of the partition wall 140 may be located between the first reel 121 and the second reel 122. The partition wall 140 may prevent the operator's body portion from entering the reel (e.g., the first reel 121 or the second reel 122) that is being driven. In an embodiment, the partition wall 140 may include a through-hole (not illustrated) to guide the movement of the separators 11 and 12 to the third opening 113. In an embodiment, the partition wall 140 may include a through-hole (not illustrated) located between the first connection portion 210 and the second connection portion 220. The first separator 11 may be connected to the second separator 12 through the through-hole formed in the partition wall 140.

The separator supply device 100 may include a guide member 150 for guiding the movement of the separators 11 and 12. When the separators 11 and 12 are moved, the guide member 150 may guide the path along which the separators 11 and 12 pass, or may reduce friction due to movement. In an embodiment, the guide member 150 may include bearings and/or rollers.

In an embodiment, the guide member 150 may include a first guide member 151 for guiding the movement of the first separator 11 and a second guide member 152 for guiding the movement of the second separator 12. The guide member 150 may include at least one guide member (e.g., a third guide member 153 and a fourth guide member 154) for guiding the movement of the separator (e.g., the first separator 11 in FIG. 4) discharged through the third opening 113. For example, the third guide member 153 and the fourth guide member 154 may selectively guide the movement of the first separator 11 or the second separator 12.

In an embodiment, the separator supply device 100 may include a processor 160 configured to control the operation of the separator supply device 100. The processor 160 may be electrically connected to the separator supply portion 120 and/or the separator connection portion 200. The processor 160 may control the rotation of the reels 121 and 122. The processor 160 may move the parts (e.g., the adsorption portions 211 and 221, cutting portions 212 and 222, driving members 215 and 225, and moving units 219 and 229) of the separator connection portion 200. In an embodiment, the processor 160 may be located within the frame 110. In another embodiment, the processor 160 may be disposed outside of the frame 110.

In an embodiment, the separator supply device 100 may include a sensor module 170. In an embodiment, the sensor module 170 may detect exhaustion (e.g., winding amount) of at least one of the first separator 11 and the second separator 12. For example, the sensor module 170 may include a first sensor 171 configured to detect the amount of winding of the first separator 11 and a second sensor 172 configured to detect the amount of winding of the second separator 12. The sensor module 170 may include a proximity sensor, an end detection sensor, and/or an ultrasonic sensor. In an embodiment, the sensor module 170 may detect a marker (not illustrated) attached to the separators 11 and 12. The processor 160 may control the operation of the separator supply portion 120 and the separator connection portion 200 based on information detected by the sensor module 170. For example, the processor 160 may generate a signal for moving at least a portion (e.g., the first connection portion 210 or the second connection portion 220) of the separator connection portion 220, based on the remaining amount of the first separator 11 or the second separator 12.

In an embodiment, the separator supply device 100 may include an input device (e.g., button) (not illustrated) configured to detect user input. The processor 160 may control the operation of the separator supply device 100 based on information sensed by the sensor module 170 or a sensed user input.

FIGS. 4 to 10 are diagrams illustrating the operation of a separator supply device based on an embodiment.

Referring to FIGS. 4 to 10, the separator supply device 100 may include a frame 110, a separator supply portion 120, a guide member 150, and a separator connection portion 200. At least part of the description of the separator supply device 100, the frame 110, the separator supply portion 120, the guide member 150, and the separator connection portion 200 of FIGS. 1, 2, and/or 3 may be applied to the frame 110, the separator supply portion 120, the guide member 150, and the separator connection portion 200 of FIGS. 4 to 10.

The separator supply device 100 uses the separator connection portion 200 to connect the first separator 11 and the second separator 12 after the first separator 11 is used, and continuously supplies the separators 11 and 12 or reduces the supply interruption time of the separators 11 and 12, thereby reducing the manufacturing time of the electrode assembly.

The separator connection portion 200 may be provided as a plurality of separator connection portions 200. For example, the separator connection portion 200 may include a first connection portion 210 for moving, cutting, and/or guiding the position of the first separator 11, and a second connection portion 220 for moving, cutting, and/or guiding the position of the second separator 12. The frame 110 may support the separator connection portion 200. For example, the frame 110 may include a first support area 114 supporting the first connection portion 210 and a second support area 115 supporting the second connection portion 220.

The separator connection portion 200 may include adsorption portions 211 and 221 for fixing the positions of the separators 11 and 12. For example, the first connection portion 210 includes a first adsorption portion 211 configured to adsorb a portion of the first separator 11 (e.g., end 11a in FIG. 9), and the second connection portion 220 may include a second adsorption portion 221 configured to adsorb a portion of the second separator 12 (e.g., end 12a of FIG. 9). The adsorption portions 211 and 212 are attached to the separators 11 and 12 to form tension for cutting the separators 11 and 12 and to fix the positions of the separators 11 and 12.

The separator connection portion 200 may include cutting portions 212 and 222 configured to cut the separators 11 and 12. For example, the first connection portion 210 includes a first cutting portion 212 configured to cut the first separator 11, and the second connection portion 220 may include a second cutting portion 222 configured to cut the second separator 12.

The separator connection portion 200 may include rollers 213 and 223 configured to guide the movement of the separators 11 and 12. For example, the first connection portion 210 may include a first roller 213 connected to the first body portion 216 and configured to guide the movement of the first separator 11. The second connection portion 220 may include a second roller 223 connected to the second body portion 226 and configured to guide the movement of the second separator 12.

The separator connection portion 200 may be movably connected to the frame 110. For example, the separator connection portion 200 may include a first moving unit 219 movably connected to the first support area 114 of the frame 110, and a second moving unit 229 movably connected to the second support area 115 of the frame 110.

The separator connection portion 200 may include adsorption portions 211 and 221, cutting portions 212 and 222, and body portions 216 and 226 connected to rollers 213 and 223. For example, the first connection portion 210 may include the first adsorption portion 211, the first cutting portion 212, and the first body portion 216 connected to the first roller 213. The second connection portion 220 may include the second adsorption portion 221, the second cutting portion 222, and the second body portion 226 connected to the second roller 223.

The separator connection portion 200 may include rotation axes 214 and 224 that rotatably connect the body portions 216 and 226 to the moving units 219 and 229. For example, the first connection portion 210 may include a first rotation axis 214 that rotatably connects the first body portion 216 to the first moving unit 219. The second connection portion 220 may include a second rotation axis 224 that rotatably connects the second body portion 226 to the second moving unit 229. In an embodiment, the first adsorption portion 211 and the first cutting portion 212 may rotate together with the first body portion 216. For example, the first adsorption portion 211, the first cutting portion 212, and/or the first roller 213 may rotate about the first rotation axis 214 together with the first body portion 216. The second adsorption portion 221 and the second cutting portion 222 may rotate together with the second body portion 226. For example, the second adsorption portion 221, the second cutting portion 222, and/or the second roller 223 may rotate about the second rotation axis 224 together with the second body portion 226. At least portions of the first adsorption portion 211 and the second adsorption portion 221 may face each other based on the rotation of the first connection portion 210 or the second connection portion 220.

The separator supply device 100 may include driving members 215 and 225. For example, the separator connection portion 200 may include driving members 215 and 225 that include a first driving member 215 configured to move the first body portion 216 relative to the frame 110 and a second driving member 225 configured to move the second body portion 226 relative to the frame 110. The first driving member 215 may move the first body portion 216 and/or the first moving unit 219 with respect to the first support area 114 of the frame 110. The second driving member 225 may move the second body portion 226 and/or the second moving unit 229 with respect to the second support area 115 of the frame 110. The driving members 215 and 225 may be optionally used as long as they have a structure for moving components such as cylinders, motors, gears, and/or the like.

Figure 4:
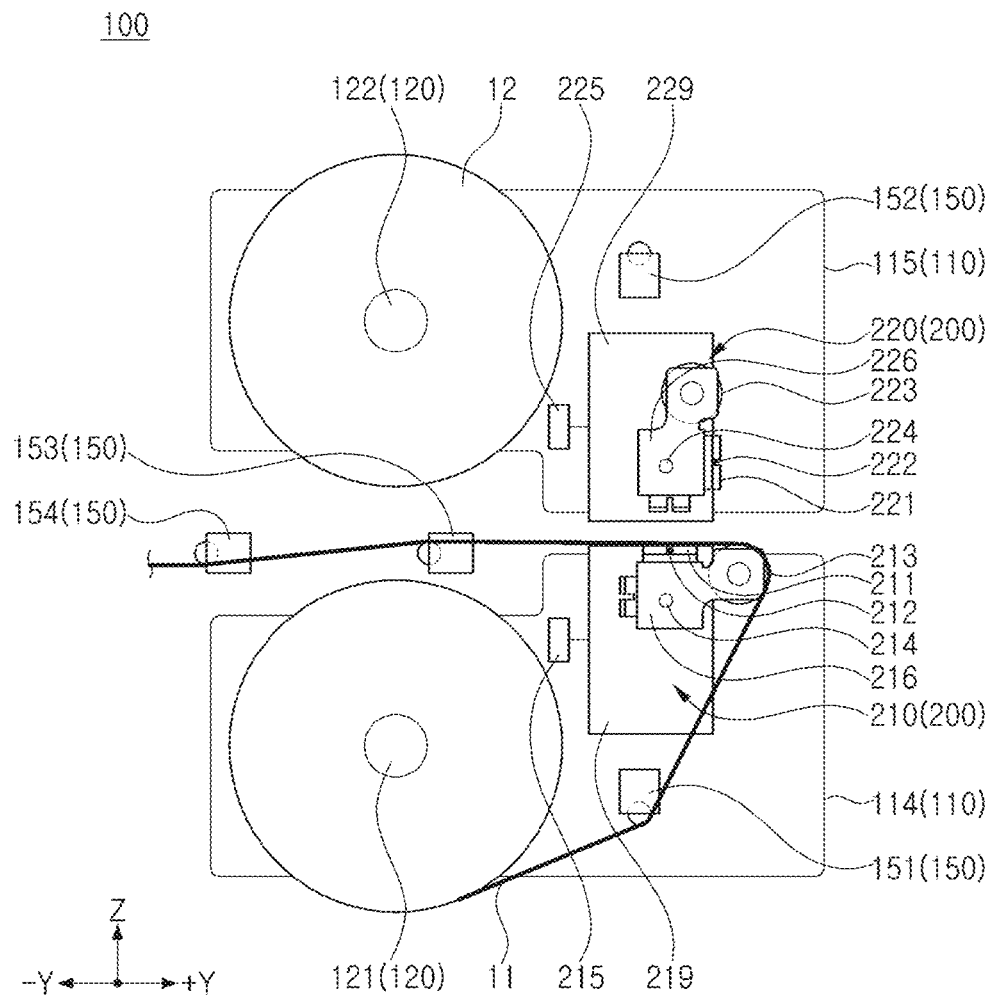
FIGS. 4 to 10 are diagrams illustrating operations of a separator supply device based on an embodiment of the disclosed technology.

Referring to FIG. 4, the separator supply device 100 may supply the first separator 11. For example, the first reel 121 may rotate. When the first reel 121 rotates, the first separator 11 wound on the first reel 121 may be unwound and moved toward the outside of the separator supply device 100 along the guide member 150. In an embodiment, the first separator 11 may be moved in contact with the first guide member 151, the first roller 213, the third guide member 153, and the fourth guide member 154.

Figure 5:
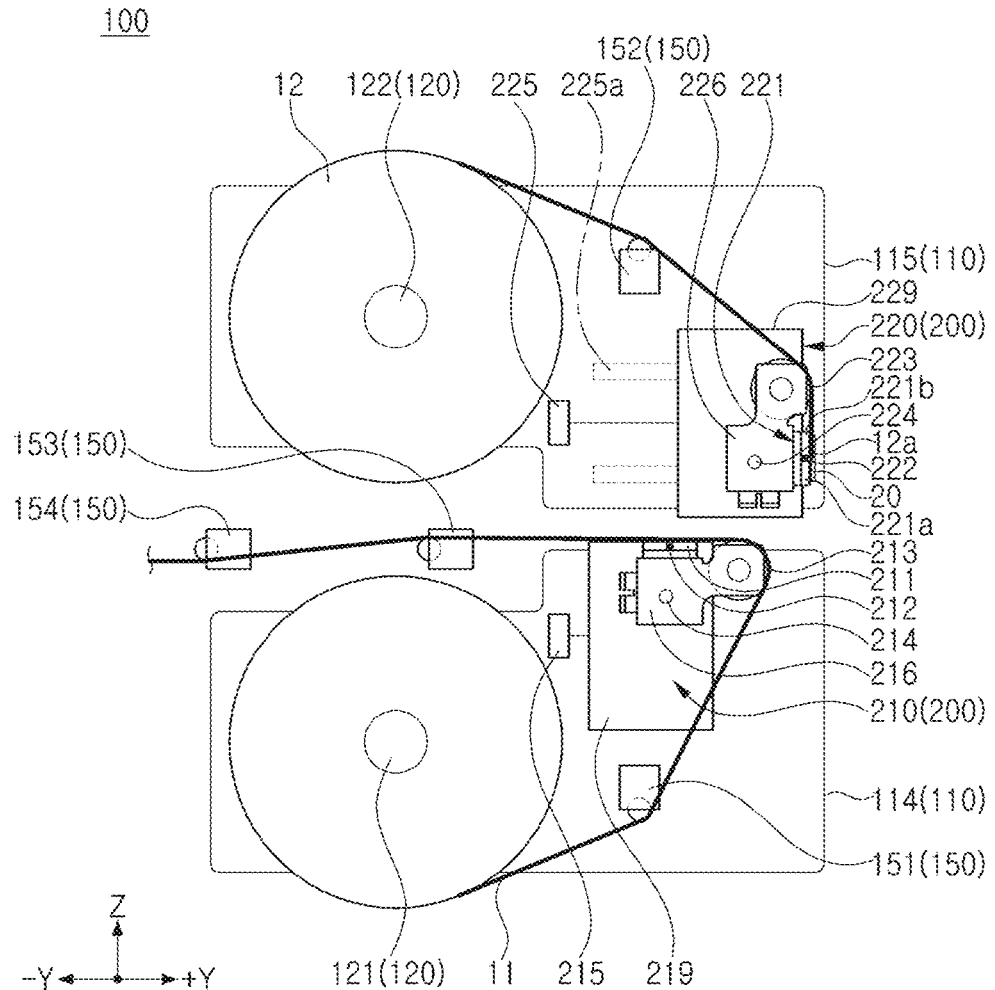
Figure 6:
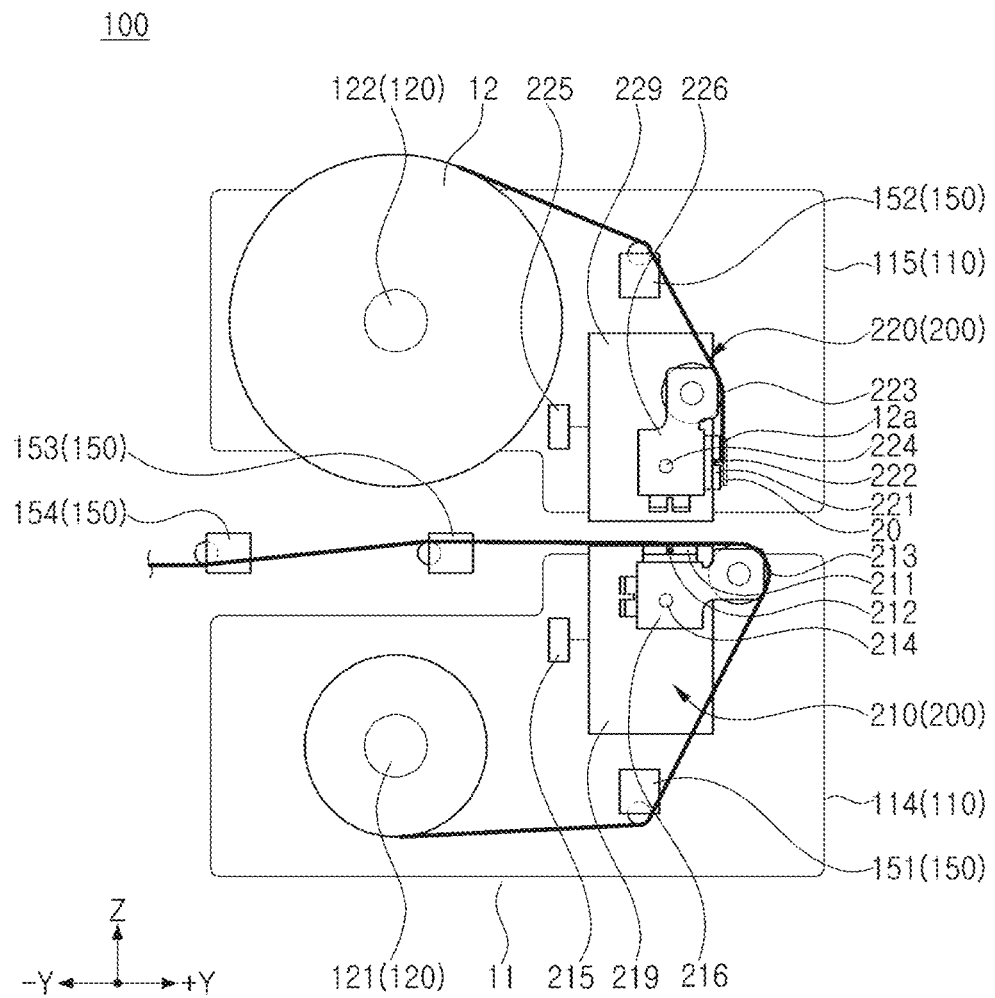

Referring to FIGS. 5 and 6, the separator supply device 100 may move (e.g., forward or backward), at least a portion of the connection portion (e.g., the first connection portion 210 or the second connection portion 220), for supply of a separator (for example, second separator 12) that is different from the separator being supplied (e.g., first separator 11). For example, at least a portion of the first connection portion 210 may be configured to move in a first direction (e.g., +Y direction) or a second direction (e.g., −Y direction) opposite to the first direction (e.g., +Y direction), while connected to the first separator 11. At least a portion of the second connection portion 220 may move in the first direction (e.g., +Y direction) or the second direction (e.g., −Y direction) while connected to the second separator 12. For example, a portion (e.g., end 12*a*) of the second separator 12 may be attached to the second adsorption portion 221. In an embodiment, the second separator 12 may move along the second guide member 152 and the second roller 223 to contact the second adsorption portion 221 and be coupled to the second adsorption portion 221. When the second adsorption portion 221 is attached to the second separator 12, at least a portion of the second connection portion 220 may be moved. In an embodiment, the second driving member 225 may include a rail 229*a* for guiding the movement of the second moving unit 229.

The second driving member 225 may move in the first direction (e.g., +Y direction) so that the second moving unit 229 is adjacent to the second opening (e.g., the second opening 112 in FIG. 1). When the second moving unit 229 is moved, configuration (e.g., second adsorption portion 221, second cutting portion 222, second roller 223, second rotation shaft 224, and second body portion 226) of the second connection portion 220 connected to the second moving unit 229, and the second separator 12 attached to the first adsorption portion 211, may move in the first direction (e.g., +Y direction) together with the second moving unit 229. The first direction (e.g., +Y direction) may be a direction toward the second opening 112 of the frame 110. As the second separator 12 is moved in the first direction (e.g., +Y direction), a portion (e.g., end 12*a*) of the second separator 12 may be positioned adjacent to the second opening 112. With the end 12*a* of the second separator 12 adjacent to the second opening 112, the operator may attach the connecting tape 20 to the end 12*a* of the second separator 12. After the connecting tape 20 is attached to the second separator 12, the second driving member 225 may move the second moving unit 229 in a second direction (e.g., −Y direction) opposite to the first direction (e.g., +Y direction). The second separator 12 and the connecting tape 20 may be moved in the second direction (e.g., −Y direction) together with the second moving unit 229.

Figure 7:
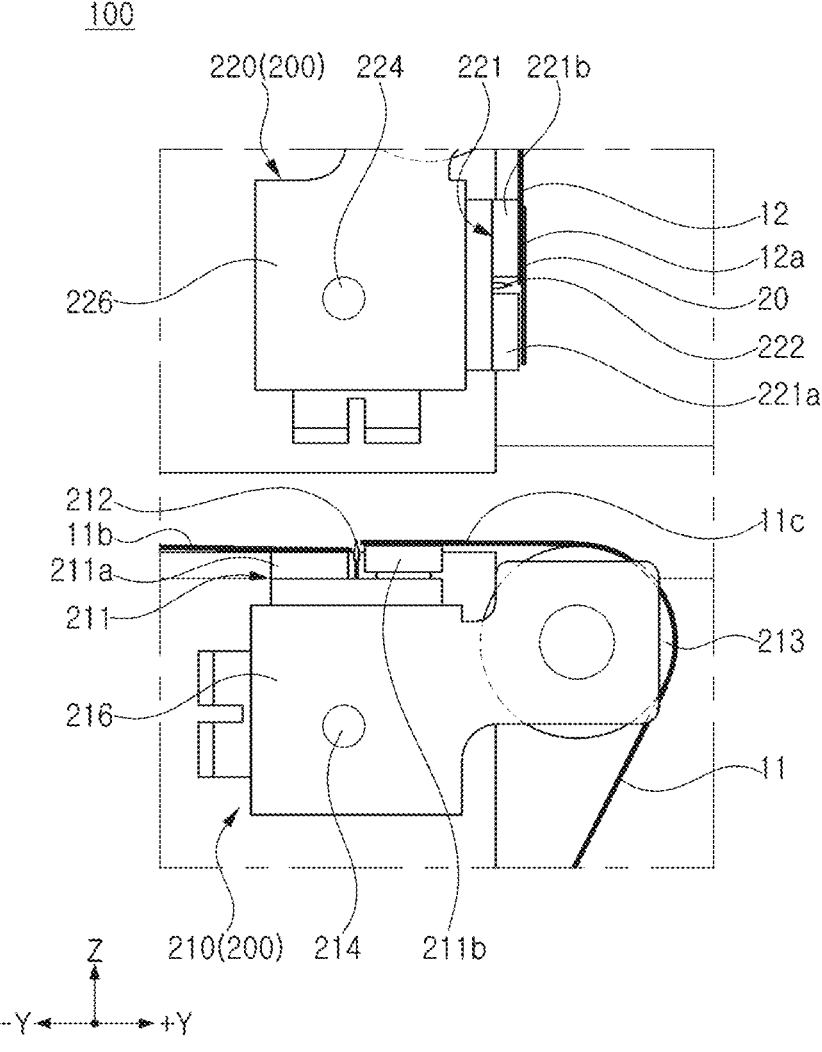

Referring to FIG. 7, the first connection portion 210 may cut the first separator 11. For example, when replacement of the first separator 11 is required due to use of the first separator 11, the first cutting portion 212 may cut the first separator 11.

In an embodiment, the first adsorption portion 211 may include a first adsorption pad 211*a* and a second adsorption pad 211*b* spaced apart from the first adsorption pad 211*a*. The first cutting portion 212 may reciprocate between the first adsorption pad 211*a* and the second adsorption pad 211*b*. For example, the first cutting portion 212 may reciprocate in the third direction (e.g., Z-axis direction) perpendicular to the first direction (e.g., +Y direction) or the second direction (e.g., −Y direction). For example, the first cutting portion 212 may be connected to a driving device (e.g., a cylinder and/or a linear structure), not illustrated. The first cutting portion 212 may protrude beyond the adsorption pads 211*a* and 211*b*, between the first adsorption pad 211*a* and the second adsorption pad 211*b*, to cut the first separator 11. A portion 11*b* of the cut first separator 11 is used to manufacture the electrode assembly, and the other portion 11*c* may be recovered by the operator. The description of the first adsorption portion 211 and the first cutting portion 212 may be applied mutatis mutandis to the second adsorption portion 221 and the second cutting portion 222. For example, the second adsorption portion 221 may include a third adsorption pad 221*a* and a fourth adsorption pad 221*b* spaced apart from the third adsorption pad 221*a*. The second cutting portion 222 may reciprocate between the third adsorption pad 221*a* and the fourth adsorption pad 221*b*.

Figure 8:
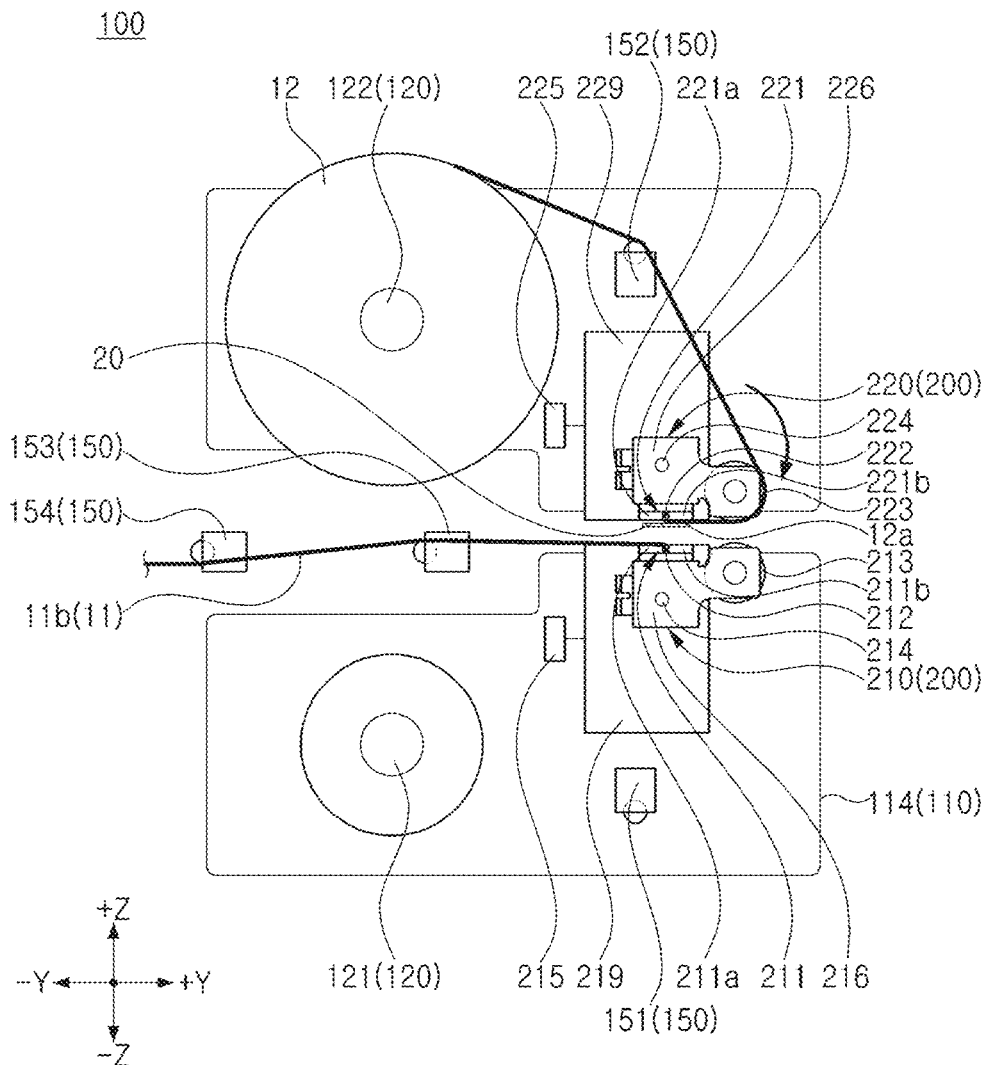
Figure 9:
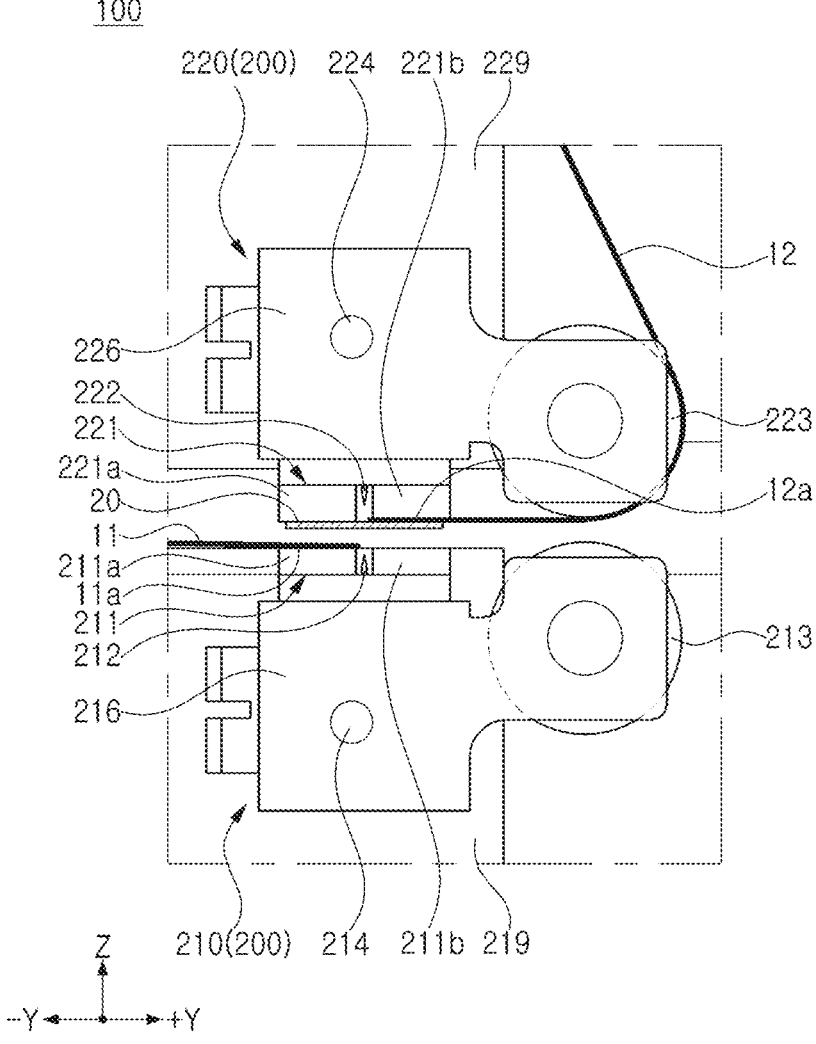

Referring to FIGS. 8 and 9, the separator connection portion 200 may connect the first separator 11 to the second separator 12 using a connecting tape 20. For example, at least a portion (e.g., the second adsorption portion 221 and the second roller 223) of the second connection portion 220 may rotate about the second rotation axis 224. When the second connection portion 220 is rotated, the second separator 12 and the connecting tape 20 may rotate around the second rotation axis 224 together with the second adsorption portion 221. As the second connection portion 220 rotates, a portion of the connecting tape 20 may face the end 11*a* of the first separator 11. For example, the end 11*a* of the first separator 11 may face a portion of the connecting tape 20, and the end 12*a* of the second separator 12 may face another portion of the connecting tape 20.

In a state in which the connecting tape 20 faces the first separator 11 and the second separator 12, the separator connection portion 200 may apply pressure to the connecting tape 20. In an embodiment, at least a portion of the first adsorption portion 211 and the second adsorption portion 221 may move in the third direction (e.g., Z-axis direction). The first separator 11 and the connecting tape 20 may be positioned between the first adsorption pad 211*a* of the first adsorption portion 211 and the third adsorption pad 221*a* of the second adsorption portion 221. The second separator 12 and the connecting tape 20 may be positioned between the second adsorption pad 211*b* of the first adsorption portion 211 and the fourth adsorption pad 221*b* of the second adsorption portion 221. The first adsorption pad 211*a* may be attached to the end 11*a* of the first separator 11. The fourth adsorption pad 221*b* may be attached to the end 12*a* of the second separator 12. With at least a portion of the first adsorption portion 211 facing at least a portion of the second adsorption portion 221, the first adsorption portion 211 and/or the second adsorption portion 221 may move toward each other. As the first adsorption portion 211 and the second adsorption portion 221 move toward each other, the connecting tape 20 may be in contact with and connected to the first separator 11 and the second separator 12. The first adsorption pad 211*a* may press the end 11*a* of the first separator 11 and the connecting tape 20 together with the third adsorption pad 221*a*. The second adsorption pad 211*b* may press the end 12*a* of the second separator 12 and the connecting tape 20 together with the fourth adsorption pad 221*b*.

As the first separator 11 and the second separator 12 are connected to each other, the separator supply device 100 may continuously deliver the separators 11 and 12 to the outside of the separator supply device 100.

Figure 10:
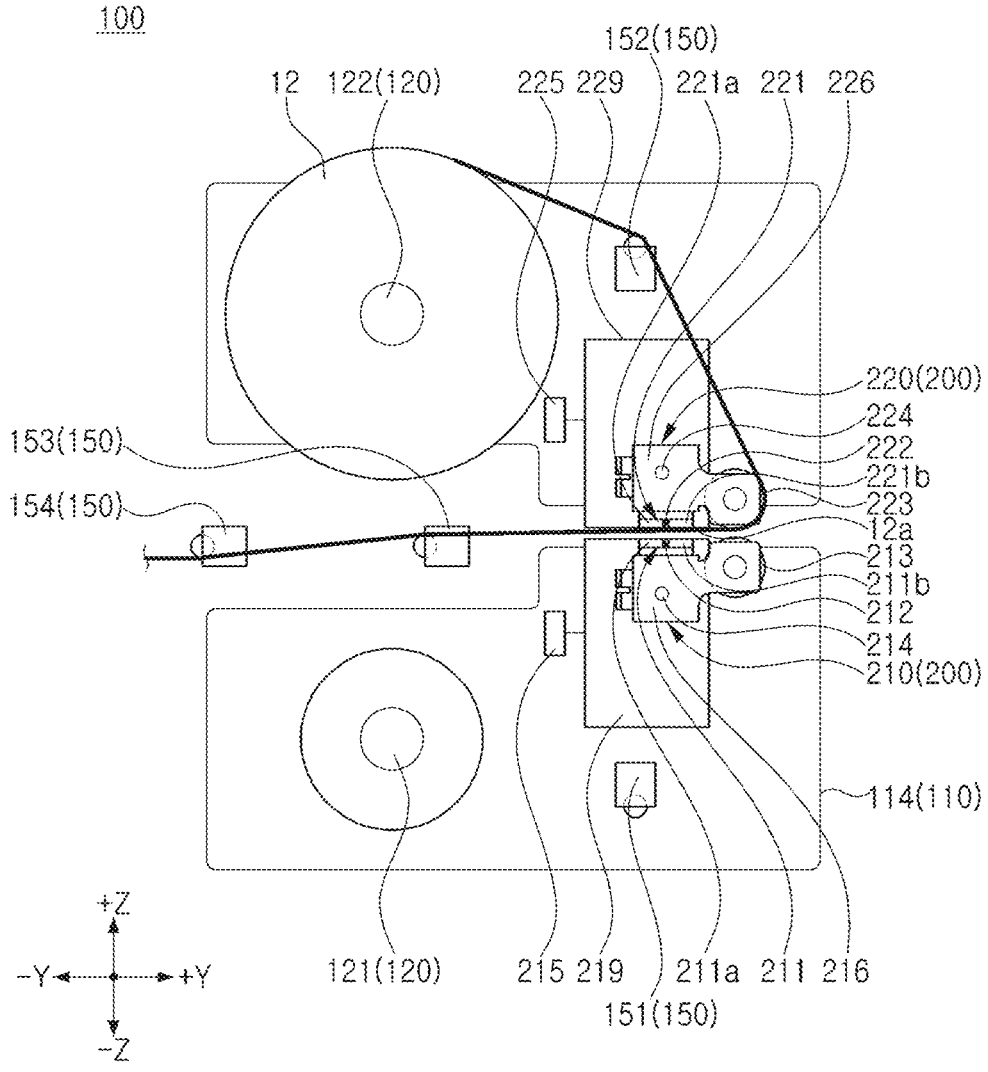

Referring to FIG. 10, the separator supply device 100 may supply the second separator 12. For example, the second reel 122 may rotate. When the second reel 122 rotates, the second separator 12 wound on the second reel 122 may be unwound and moved toward the outside of the separator supply device 100 along the guide member 150. In an embodiment, the second separator 12 may be moved in contact with the second guide member 152, the second roller 223, the third guide member 153, and the fourth guide member 154.

In some embodiments of the disclosed technology, a structure in which the second separator 12 is used after the first separator 11 is used has been described, but this is an example. For example, in an embodiment, the second separator 12 may be used first and then the first separator 11 may be used. In an embodiment, the first connection portion 210 and the second connection portion 220 may have a symmetrical shape. For example, in some embodiments of the disclosed technology, the description of the second connection portion 220 may be applied to the first connection portion 210, and the description of the first connection portion 210 may be applied to the second connection portion 220.

Figure 11:
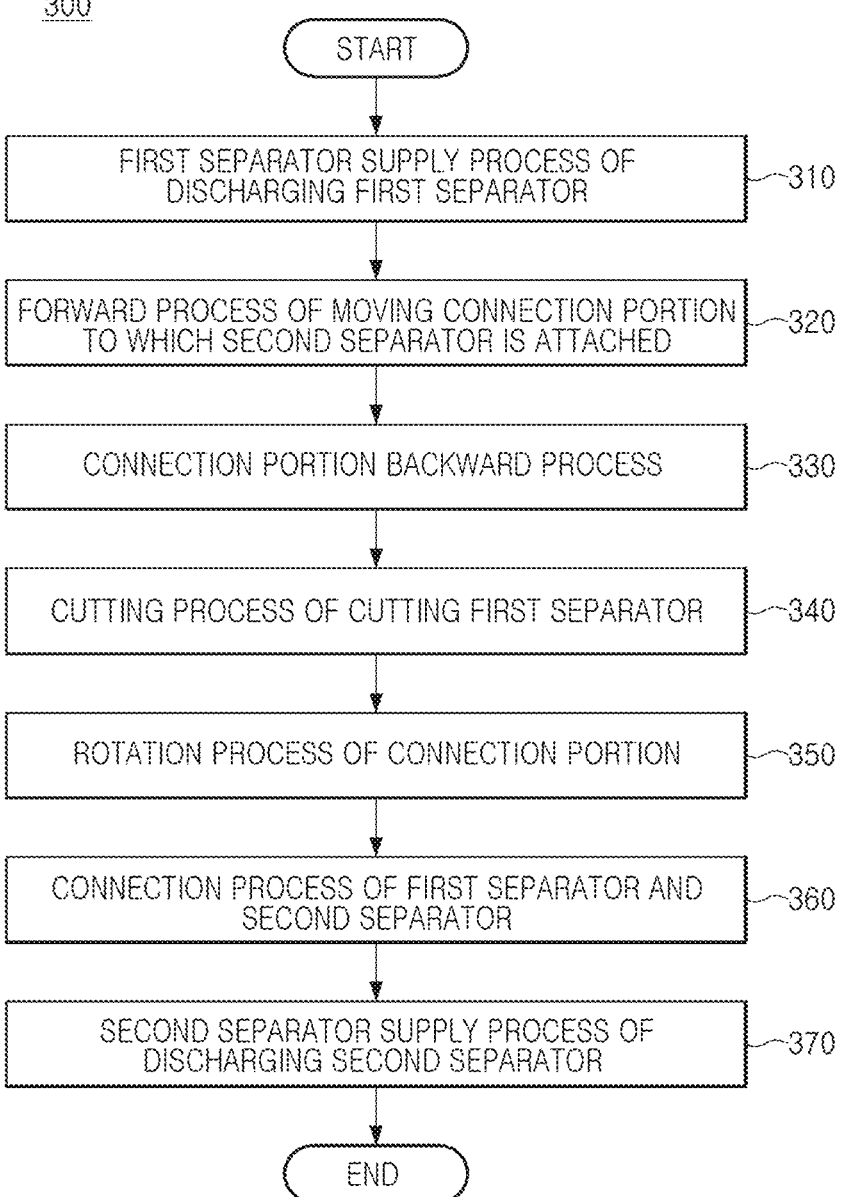
FIG. 11 is a flowchart of a separator supply method based on an embodiment.

FIG. 11 is a flowchart of a separator supply method based on an embodiment.

Referring to FIG. 11 along with FIGS. 1 to 10, a separator supply method 300 may include: a first separator supply process 310, which includes discharging the first separator; a forward process 320, which includes moving the connection portion to which the second separator is attached in the first direction; a backward process 330, which includes moving the connection portion in a second direction, opposite to the first direction; a cutting process 340, which includes cutting the first separator; a rotation process 350, which includes rotating the connection portion; a connection process 360, which includes the first separator and the second separator; and/or a second separator supply process 370, which includes discharging the second separator using a second reel configured to wind the second separator therearound.

The separator supply method 300 of FIG. 11 may be a supply method using the separator supply device 100 of FIGS. 1 to 10 or a method of manufacturing an electrode assembly using the separator supply device 100 of FIGS. 1 to 10. For example, the description regarding the separator supply device 100 illustrated in FIGS. 1 to 10 may be applied to the separator supply method 300 of FIG. 11.

The first separator supply process 310 may use the first reel 121 configured to wind the first separator 11 therearound, to discharge or deliver the first separator 11 to the outside of the separator supply device 100.

The forward process 320 may be a process of moving the connection portion (e.g., the separator connection portion 200 of FIG. 5) including the second adsorption portion 221 in the first direction (e.g., +Y direction), to attach the connecting tape 20 to the second separator 12 spaced apart from the first separator 11. The separator connection portion 200 may be a second connection portion (e.g., the second connection portion 220 of FIGS. 4 to 10). In the forward process 320, the separator connection portion (e.g., the second connection portion 220) including the second adsorption portion 221 to which the second separator 12 is attached may be moved in the first direction (e.g., +Y direction). The first direction (e.g., +Y direction) may be a direction in which the second connection portion 220 moves adjacent to the frame 110. By the forward process 320, the second adsorption portion 221 of the second connection portion 220 may be positioned adjacent to the second opening 112. The operator may attach the connecting tape 20 to the second separator 12 adjacent to the second opening 112.

The backward process 330 may be an operation of moving the second connection portion 220 in a second direction (e.g., −Y direction) that is opposite to the first direction (e.g., +Y direction), after the connecting tape 20 is attached to the second separator 12. The forward process 320 and the backward process 330 may be performed based on power supplied from the driving members 215 and 225 to the body portions 216 and 226 and/or the moving units 219 and 229.

The cutting process 340 may be a process of cutting a separator that is in operation (e.g., the first separator 11). The cutting process 340 may be performed by the first cutting portion 312.

The rotation process 350 may be an operation of rotating at least a portion of the second connection portion 220 so that the second adsorption portion 221 faces the first adsorption portion 211. The second adsorption portion 221 may be rotated to face the first adsorption portion 211 attached to the first separator 11, while attached to the second separator 12 to which the connecting tape 20 is attached.

The connection process 360 of the first separator 11 and the second separator 12 may be performed using the first adsorption portion 211 and the second adsorption portion 221. For example, the first adsorption portion 211 and the second adsorption portion 221 may be moved adjacent to each other, and may attach the connecting tape 20 to the first separator 11 and the second separator 12. For example, the connecting tape 20, a portion of which is attached to the second separator 12, may be attached to the first separator 11 based on pressure by the adsorption portions 211 and 221.

The second separator supply process 370 may use the second reel 122 configured to wind the second separator 12 therearound, to discharge or deliver the second separator 12 to the outside of the separator supply device 100.

As set forth above, in some embodiments, by automatically replacing a separator, facility operation rate may be increased and manufacturing time may be reduced.

The content described above is merely an example of applying the principles of the disclosed technology, and other configurations may be further included without departing from the scope of the disclosed technology.

The disclosed technology can be implemented for manufacturing rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. The secondary batteries made by using the disclosed technology can be used to address various adverse effects such as air pollution and greenhouse emissions by powering electric vehicles (EVs) as alternatives to vehicles using fossil fuel-based engines and by providing battery-based energy storage systems (ESSs). Such secondary batteries may include, for example, lithium ion batteries, nickel-cadmium batteries, nickel-metal hydride batteries, and nickel-hydrogen batteries.

Only specific examples of implementations of certain embodiments are described. Variations, improvements and enhancements of the disclosed embodiments and other embodiments may be made based on the disclosure of this patent document.

What is claimed is:

1. A separator supply device comprising:
a frame;
a separator supply portion mounted on the frame, the separator supply portion including: a first reel mounting portion configured to accommodate a first reel configured to be wound with a first separator; and a second reel mounting portion configured to accommodate a second reel spaced apart from the first reel and configured to be wound with a second separator; and
a separator connection portion configured to: adsorb an end of the first separator unwound from the first reel and an end of the second separator unwound from the second reel; and connect the first separator to the second separator,
wherein the separator connection portion includes:
a first connection portion including: a first adsorption portion configured to adsorb an end of the first separator; a first cutting portion configured to cut the first separator attached to the first adsorption portion; and a first body portion configured to connect the first adsorption portion and the first cutting portion to each other; and
a second connection portion including: a second adsorption portion configured to adsorb an end of the second separator; a second cutting portion configured to cut the second separator attached to the second adsorption portion; and a second body portion configured to connect the second adsorption portion and the second cutting portion to each other.

2. The separator supply device of claim 1, wherein
the frame includes a first moving unit and a second moving unit,
the first connection portion includes a first rotation axis rotatably connecting the first body portion to the first moving unit of the frame,
the second connection portion includes a second rotation axis rotatably connecting the second body portion to the second moving unit of the frame,
the first adsorption portion and the first cutting portion are configured to rotate together with the first body portion,
the second adsorption portion and the second cutting portion are configured to rotate together with the second body portion, and
the first adsorption portion and the second adsorption portion are configured to at least partially face each other as at least one of the first connection portion or the second connection portion rotates.

3. The separator supply device of claim 1, further comprising a driving member including a first driving member configured to move the first body portion relative to the frame and a second driving member configured to move the second body portion relative to the frame.

4. The separator supply device of claim 1, wherein
the first connection portion includes a first roller connected to the first body portion and configured to guide the first separator to move in a first predetermined direction, and
the second connection portion includes a second roller connected to the second body portion and configured to guide the second separator to move in a second predetermine direction.

5. The separator supply device of claim 1, wherein
the first adsorption portion includes a first adsorption pad and a second adsorption pad spaced apart from the first adsorption pad,
the first cutting portion is configured to reciprocate between the first adsorption pad and the second adsorption pad,
the second adsorption portion includes a third adsorption pad and a fourth adsorption pad spaced apart from the third adsorption pad, and
the second cutting portion is configured to reciprocate between the third adsorption pad and the fourth adsorption pad.

6. The separator supply device of claim 5, wherein the first adsorption pad is configured to be attached to an end of the first separator, the fourth adsorption pad is configured to be attached to an end of the second separator, the first adsorption pad is configured to press the end of the first separator and a connecting tape together with the third adsorption pad, and the second adsorption pad is configured to press the end of the second separator and the connecting tape together with the fourth adsorption pad.

7. The separator supply device of claim 5, wherein in a state in which at least a portion of the first adsorption portion faces at least a portion of the second adsorption portion, the first adsorption portion or the second adsorption portion is configured to move toward each other.

8. The separator supply device of claim 1, wherein at least a portion of the first connection portion is configured to move in a first direction or a second direction, opposite to the first direction, while being connected to the first separator, and at least a portion of the second connection portion is configured to move in the first direction or the second direction, while being connected to the second separator.

9. The separator supply device of claim 1, wherein the frame includes a first opening configured to expose at least a portion of the first separator to an outside of the frame and a second opening configured to expose at least a portion of the second separator to the outside of the frame.

10. The separator supply device of claim 9, further comprising a cover portion including a first cover configured to cover the first opening, and a second cover configured to cover the second opening.

11. The separator supply device of claim 1, further comprising a partition wall connected to the frame and at least partially located between the first reel and the second reel.

12. The separator supply device of claim 1, further comprising a sensor module configured to detect a winding amount of at least one of the first separator and the second separator.

13. The separator supply device of claim 12, further comprising a processor configured to control operations of the separator supply portion and the separator connection portion, based on information detected by the sensor module, wherein the processor is configured to generate a signal for moving at least a portion of the separator connection portion based on a remaining amount of the first separator or the second separator.

14. The separator supply device of claim 1, further comprising a guide member including a first guide member configured to guide a movement of the first separator, a second guide member configured to guide a movement of the second separator, and a third guide member configured to selectively guide the movement of the first separator or the second separator.

15. A separator supply method comprising:

discharging a first separator using a first reel configured to be wound with the first separator thereon;

moving a second connection portion including a second adsorption portion in a first direction to attach a connecting tape to a second separator spaced apart from the first separator;

moving the second connection portion in a second direction opposite to the first direction;

cutting the first separator using a first cutting portion;

rotating the second connection portion so that the second adsorption portion attached to the second separator faces a first adsorption portion attached to the first separator;

attaching the connecting tape to the first separator and the second separator using a first connection portion including the first adsorption portion and the second connection portion including the second adsorption portion; and discharging the second separator using a second reel configured to be wound with the second separator thereon.

16. The method of claim 15, further comprising detecting a winding amount of at least one of the first separator and the second separator.

17. The method of claim 15, further comprising:

controlling operations of the separator supply portion and the separator connection portion, based on information detected by a sensor module configured to detect a winding amount of at least one of the first separator and the second separator.

18. The method of claim 17, further comprising:

generating a signal for moving at least a portion of the separator connection portion based on a remaining amount of the first separator or the second separator.

19. The method of claim 15, further comprising:

guiding a movement of the first separator using a first guide member;

guiding a movement of the second separator using a second guide member; and selectively guiding the movement of the first separator or the second separator using a third guide member.

* * * * *